US008493262B2

(12) United States Patent
Boufounos et al.

(10) Patent No.: US 8,493,262 B2
(45) Date of Patent: Jul. 23, 2013

(54) SYNTHETIC APERTURE RADAR IMAGE FORMATION SYSTEM AND METHOD

(75) Inventors: Petros T. Boufounos, Boston, MA (US); Dennis Wei, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 310 days.

(21) Appl. No.: 13/026,085

(22) Filed: Feb. 11, 2011

(65) Prior Publication Data

US 2012/0206292 A1    Aug. 16, 2012

(51) Int. Cl.
*G01S 13/00* (2006.01)
(52) U.S. Cl.
USPC ....................................................... 342/25 R
(58) Field of Classification Search
USPC ........................................................ 342/25
See application file for complete search history.

(56) References Cited

U.S. PATENT DOCUMENTS

| | | | | |
|---|---|---|---|---|
| 5,812,082 A | * | 9/1998 | Moreira et al. | 342/25 A |
| 7,245,659 B2 | * | 7/2007 | Sekiguchi et al. | 375/240.12 |
| 2009/0278921 A1 | * | 11/2009 | Wilson | 348/77 |
| 2010/0207808 A1 | * | 8/2010 | Prats et al. | 342/25 F |
| 2010/0215255 A1 | * | 8/2010 | Xiao et al. | 382/159 |
| 2010/0278439 A1 | * | 11/2010 | Lennington et al. | 382/209 |
| 2012/0030219 A1 | * | 2/2012 | Xu et al. | 707/754 |

OTHER PUBLICATIONS

Elaine T. Hale et al., "Fixed-Point Continuation for l1-Minimization Methodology and Convergence," SIAM J. Optim. vol. 19, No. 3, pp. 1107-1130: 2008 Society for Industrial and Applied Mathematics.
Harmut Runge et al. "A Novel High Precision SAR Focussing Algorithm Based on Chirp Scaling," German Aerospace Research Establishment (DLR) 91-72810/92S03.00 IEEE 1992.

* cited by examiner

*Primary Examiner* — Timothy A Brainard
(74) *Attorney, Agent, or Firm* — Dirk Brinkman; Gene Vinokur

(57) ABSTRACT

A saturated input signal acquired by a synthetic aperture radar (SAR) system is processed by estimating a reconstruction that generated the input signal, reproducing an input signal from an estimated reconstruction to generate a reproduced signal, comparing the reproduced signal with the input signal; adjusting an estimated reconstruction based on the comparison; and iterating from the reproducing step until a termination condition is reached.

13 Claims, 3 Drawing Sheets

SYNTHETIC APERTURE RADAR IMAGE FORMATION SYSTEM AND METHOD

FIELD OF THE INVENTION

This invention relates generally to synthetic aperture radar, and more particularly to forming high quality images from saturated data.

BACKGROUND OF THE INVENTION

Inverse Problems

The study of inverse problems is a well-established discipline with several applications in a variety of fields, including signal processing and synthetic aperture radar (SAR) systems. The theory of inverse problems examines when and how a function can be inverted to infer the input from the output of the function. Such problems are abundant in signal acquisition and processing systems. The formulation of these problems as inverse problems has produced significant results in the areas of image de-noising, de-blurring and super-resolution.

A common inverse problem in signal processing is the recovery of a signal x from a set of measurements y, $$y = A(x) + n, \quad (1)$$

where the function A models the acquisition system, and n represents noise. The goal of the reconstruction process is to determine a signal estimate $\hat{x}$ that is close to the signal x.

If the acquisition function A is invertible and the noise is negligible, an obvious choice is to use the inverse of the function A to determine x. However, that method can fail if A is not injective, i.e., the data can be explained by multiple signals, or if there is substantial noise. A more general approach is to estimate x by minimizing the following cost function $$\hat{x} = \operatorname*{argmin}_{x} f(y, A(x)) + \lambda g(x), \quad (2)$$

where $f(\bullet, \bullet)$ is a cost function measuring data fidelity according to the properties of the acquisition system and the noise, g(x) is a regularizer that incorporates knowledge about the properties of the signal of interest and penalizes unwanted solutions, and λ controls the trade-off between the two terms in the cost function. The formulation in Eqn. (2) offers flexibility in accommodating a range of acquisition scenarios and signal models.

In the special case where $f(y, A(x)) = \|y - A(x)\|_2$, $g(x) = 0$, the function A is linear, and the system is overdetermined, the solution to Eqn. (2) uses a pseudoinverse function $A^\dagger$. The pseudoinverse is also the solution when the system is underdetermined and $g(x) = \|x\|_2$, i.e., a least-energy solution is desired.

SAR Image Formation

The formation of SAR images can be formulated as an inverse problem. Specifically, the ideal SAR acquisition process can be viewed as a linear system, i.e., an instance of Eqn. (1), wherein x represents a two-dimensional (2-D) image of surface reflectivity, y represents the received signal, and the function A is linear.

Henceforth, A is used to represent a linear acquisition function. The received signal y is usually arranged in a 2-D form similar to the SAR image. Samples of each reflected pulse can be thought of as forming a row vector, with different reflected pulses stacked together to form a matrix of data. To emphasize that the function A is linear, we use the notation Ax to denote the application of function A(•) on the ground signal (image) x. Ax can be considered as a matrix multiplication when we rearrange x in one single column vector instead of a 2D image.

Each row of the data matrix y corresponds to a different position of the acquisition platform along its path. The dimension along the path is referred to as the azimuth. Each column corresponds to a delay from the transmission of a pulse. Because the delay is proportional to the distance the pulse has traveled, this second dimension is referred to as the range.

Several known image formation procedures can be interpreted from the viewpoint of inverse problems as determining approximations to the pseudoinverse function $A^\dagger$. The approximations enable efficient implementations to estimate the SAR image x. For example, many procedures rely on pulse compression, which refers to the approximate deconvolution of the received signal through correlation with the transmitted pulse. The correlation can be made highly efficient by using a Fast Fourier Transform (FFT). Pulse compression corresponds to the exact inverse, at least within the bandwidth of interest, if the received pulse is sampled at the Nyquist rate, and corresponds closely to the pseudoinverse if the received pulse is slightly oversampled, which is usually the case in practical SAR systems.

One of the most widely used image formation procedures is the Chirp Scaling Algorithm (CSA), Runge et al., "A novel high precision SAR focusing algorithm based on chirp scaling," International Geoscience and Remote Sensing Symposium (IGARSS), May 1992, pp. 372-375, incorporated herein by reference.

As shown in FIG. 1, an azimuth FFT 110 is applied to an input signal 101, followed by chirp scaling 120, a range FFT 130, range compression 140, a range IFFT 150, chirp scaling 160, azimuth compression 170, and an azimuth inverse FFT (IFFT) 180 to produce an output signal 109.

The chirp scaling approximates a time-varying delay of a linear chirp signal by means of multiplications with two other chirp signals. Chirp scaling is used in the CSA to correct for range migration, the variation in distance to a given target, and hence an associated delay, caused by the motion of the acquisition platform. The CSA is very efficient due to its composition in terms of FFTs and multiplications only. For this reason, CSA forms the basis for our method of determining the acquisition function and its adjoint as described below.

Saturation and Inverse Problems

Saturation of data values is a significant problem in SAR signal acquisition because of large fluctuations in data amplitudes and the use of low-precision quantizers. Conventional image formation methods, such as the CSA, usually do not address data saturation specifically.

Signal saturation is a very common problem encountered in analog-to-digital (A/D) conversion systems because electronic components have a finite voltage range beyond which the signal amplitude is not allowed to vary. In addition, quantizers use a finite number of quantization levels. If the acquired signal amplitude varies beyond saturation threshold values ±T, then the acquired amplitude saturates to ±T.

Although saturation on its own is undesirable, in the presence of severe quantization, saturation can be beneficial. Specifically, increasing the gain of the signal and promoting saturation also increases the signal-to-quantization noise ratio in the unsaturated measurements. If the saturation is appropriately taken into account, overall reconstruction performance can be increased.

The most common approach to handling saturation, i.e., using the saturated values at face value in the reconstruction as if no saturation occurred, produces severe artifacts. The reconstruction error can be reduced using a consistent reconstruction approach, i.e., ensuring that the reconstructed signal estimate produces the same saturation if re-acquired. Consistent reconstruction significantly improves the reconstruction error when used with quantized and saturated measurements.

SUMMARY OF THE INVENTION

According to embodiments of the invention, the formation of synthetic aperture radar (SAR) images is formulated as an inverse problem. The embodiments of the invention increase the quality of the SAR images when there is data saturation, specifically by optimizing a one-sided quadratic cost function to provide consistency with the received data. The SAR acquisition process is modeled using a linear function. The function is efficient to implement and can be used together with its adjoint in an iterative optimization process. The method controls azimuth ambiguities and incorporates image models to enable reconstruction from saturated SAR data.

DETAILED DESCRIPTION OF THE PREFERRED EMBODIMENTS

Figure 1:
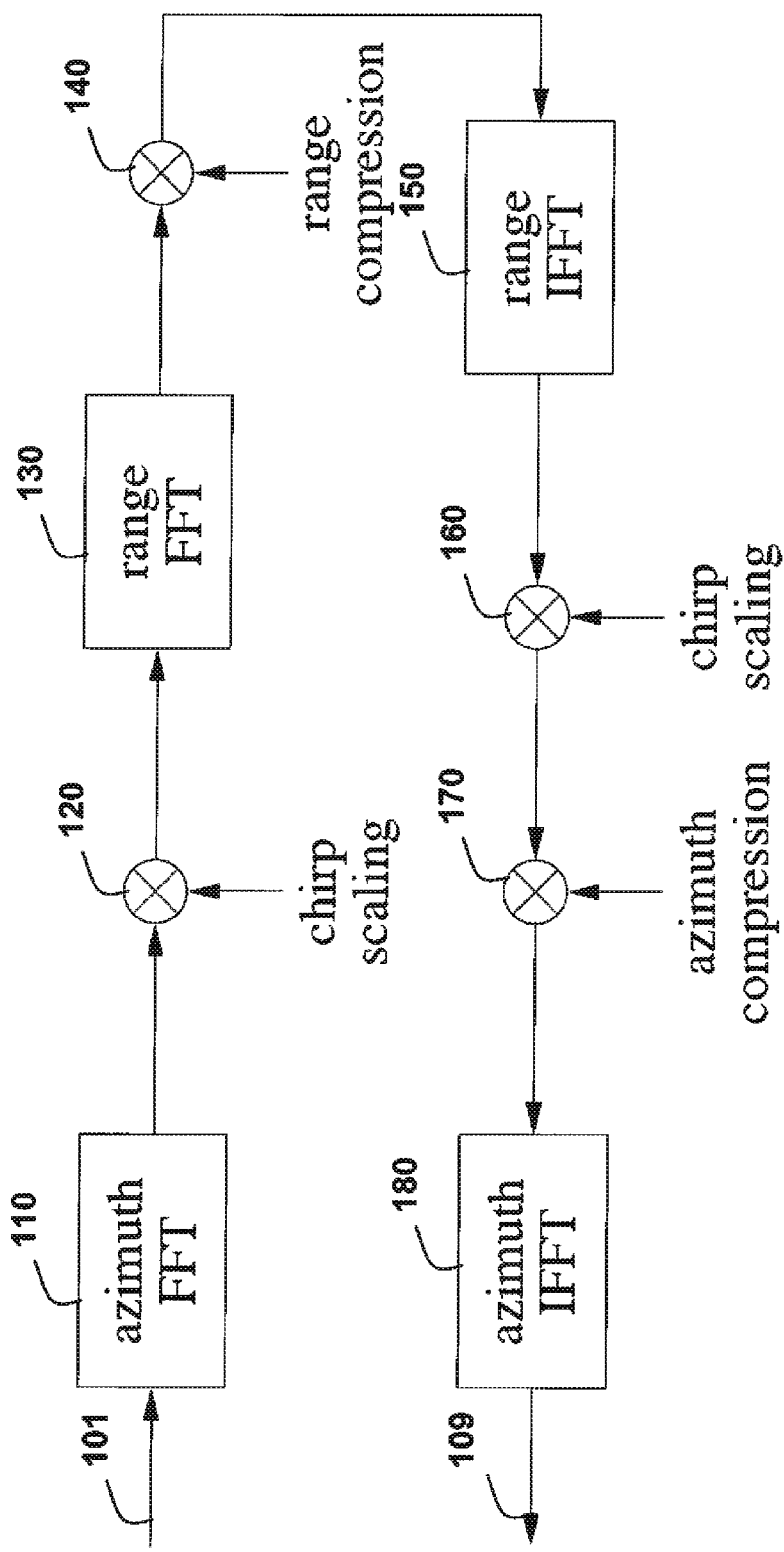
FIG. 1 is a block diagram of a conventional chirp scaling algorithm.

We represent a linear system with a finite dynamic range by $$y = S(Ax), \quad (3)$$

where A is a system acquisition function, and $S(\cdot)$ is a non-linear scalar saturation function $$S(x) = \text{sign}(x)\min\{|x|, T\} \quad (4)$$

applied element-wise to all the components of the input signal.

Instead of using a conventional least-squares fidelity criterion, we enforce a one-sided quadratic penalty on saturated measurements to ensure consistent image reconstruction. More specifically, for the quadratic penalty, we use a cost function $$f(y, Ax) = \frac{1}{2}\sum_i r_i^2(y_i, (Ax)_i), \quad (5)$$

$$r_i(y_i, (Ax)_i) = \begin{cases} (Ax)_i - y_i & |y_i| < T \\ ((Ax)_i - T)^- & y_i \geq +T \\ ((Ax)_i + T)^+ & y_i \leq -T, \end{cases} \quad (6)$$

where $(y)^- = \min(y, 0)$, $(y)^+ = \max(y, 0)$, and i indexes the real and imaginary parts of the data separately. As an advantage, the cost function penalizes inconsistent solutions, is simple to optimize, and, due to its quadratic nature, reduces additive noise before the saturation occurs.

Although minimizing the saturation-robust cost function in Eqn. (5) often produces acceptable solutions, a signal model can also be used to further resolve the ambiguities inherent in data saturation and quantization.

SAR Image Formation

Implementation of A and $A^H$

The cost function in Eqn. (5) can be minimized using a variety of iterative optimization procedures. Most procedures require repeated computation of the acquisition function A and its adjoint $A^H$. Efficient implementation of these functions is especially important in SAR image reconstruction because of the high dimensionality of the images.

To achieve efficiency, our embodiments are loosely based on the Chirp Scaling Algorithm (CSA) described above. Given that the CSA is an approximation to the pseudoinverse $A^\dagger$, the acquisition function A, which can be used to reproduce the raw SAR data 209, has a block diagram, shown in FIG. 2. This is essentially the reverse of the function for the conventional CSA.

An azimuth fast Fourier transform (FFT) 210 is applied to an input signal 201, followed by multiplying by an azimuth frequency response $H_a(R_0, f_\eta)$ 220, a first chirp scaling 230, a range FFT 240, multiplying by a range frequency response $P_{2df}(f_\tau, f_\eta)$ 250, a range inverse FFT (FFT) 260, a second chirp scaling 270 and an azimuth IFFT 280 to produce an output signal 209, which is the raw SAR data.

It is understood that the above function can be implemented in a processor 200 connected to a memory and input/output interfaces as known in the art, or discrete hardware components.

To implement the adjoint, which produces the SAR image, we exploit the fact that the adjoint of a composition of functions is the composition of the individual adjoints in reverse order. The adjoint of the FFT is the IFFT, up to a scale factor, and the adjoint of multiplication by a function is multiplication by the complex conjugate of the same function. Hence, the adjoint has the same block diagram as the CSA with the azimuth compression function replaced by azimuth frequency response $$H_a^*(R_0, f_\eta),$$

where * indicates the complex conjugate. a signifies the azimuth response, $R_0$ the range of closest approach, and $f_\eta$ is the azimuth frequency.

The range compression function is now the Fourier transform $$P_{2df}^*(f_\tau, f_\eta),$$

where 2df signifies two-dimensional frequency domain, and $f_\tau$ is range frequency.

We now describe our implementation of the acquisition function A in greater detail. We assume that the image includes a rectangular grid of point targets. We focus on the response due to a single point target of unit amplitude. Because the function A is shift-invariant in azimuth, we can equivalently specify the response in the range-Doppler (range time $\tau$, azimuth frequency $f_\eta$) domain. For a unit point target at the range of closest approach $R_0$, the range-Doppler response is given approximately by $$H_{rd}(\tau, f_\eta) = H_a(R_0, f_\eta) p\left(\tau - \frac{2R_0}{cD(f_\eta)}, f_\eta\right), \quad (7)$$

where rd signifies range-Doppler domain, $H_a(R_0, f_\eta)$ is the azimuth frequency response, $p(\tau, f_\eta)$ is the transmitted pulse, $D(f_\eta)$ is the range migration factor, and c is the speed of light. The pulse $p(\tau, f_\eta)$ is assumed to be a linear chirp and is a function of $f_\eta$ in the range-Doppler domain.

The response in Eqn. (7) is not shift-invariant in range because of the presence of the range migration factor $D(f_1)$. However, in the case of a linear chirp pulse, chirp scaling can be used to approximate the range response in Eqn. (7) by means of a convolution with a modified chirp preceded and followed by multiplications with chirp scaling functions. The convolution is implemented using the FFT as a multiplication with the Fourier transform $P_{2df}(f_\tau, f_\eta)$ 250, as shown in FIG. 2.

Figure 2:
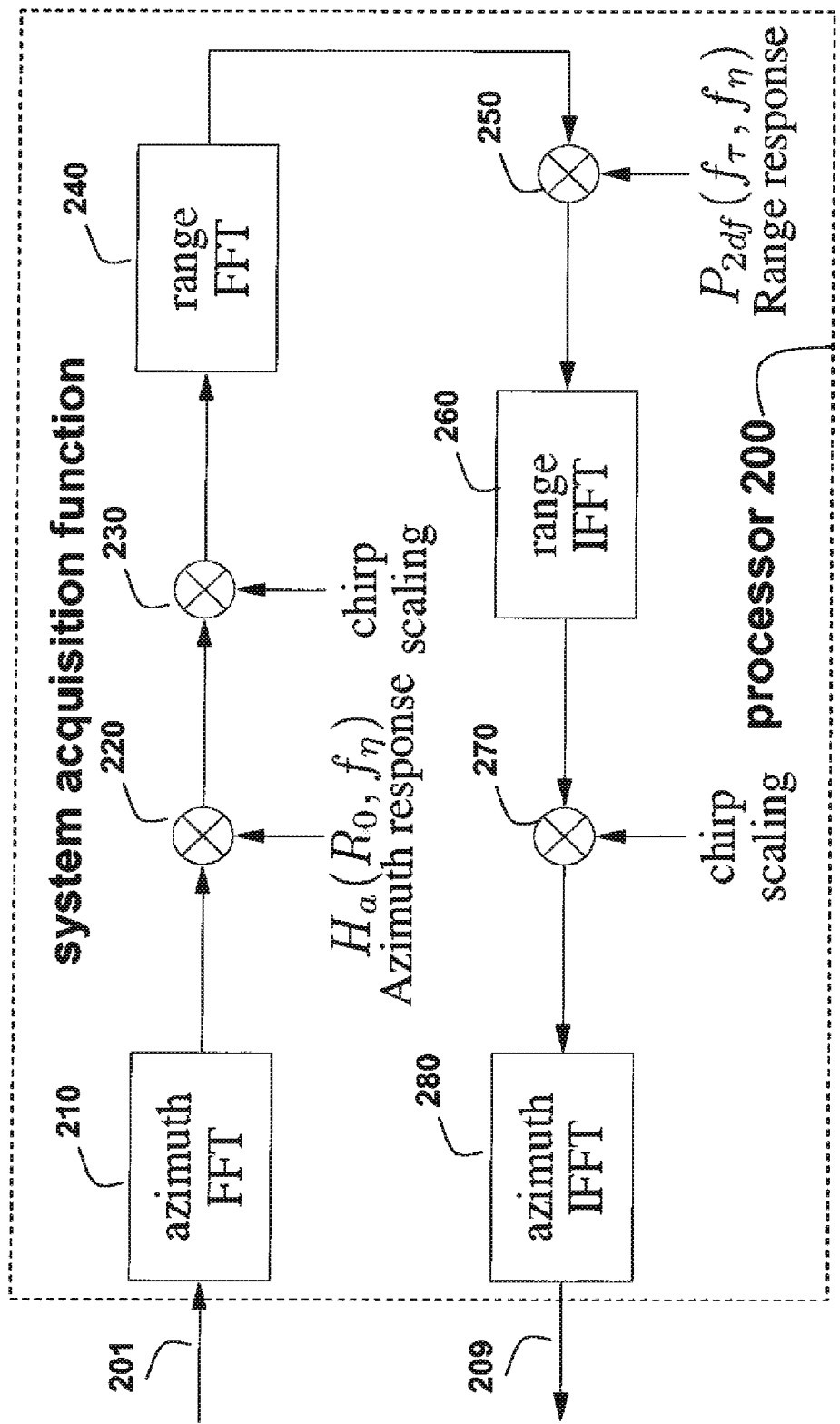
FIG. 2 is a block diagram of an acquisition function used for synthetic aperture radar image formation according to embodiments of the invention.

FIG. 2 shows that the complexity of computing the acquisition function A is the same as that for the CSA FIG. 1. All of the functions in FIG. 2 that are multiplied with the signal can be pre-determined and stored for faster computation. In a discrete-time implementation, care should be taken to use sufficiently high sampling rates to represent $H_\alpha(R_0, f_\eta)$ and $P_{2df}(f_\tau, f_\eta)$ with minimal aliasing.

Basic Optimization

Figure 3:
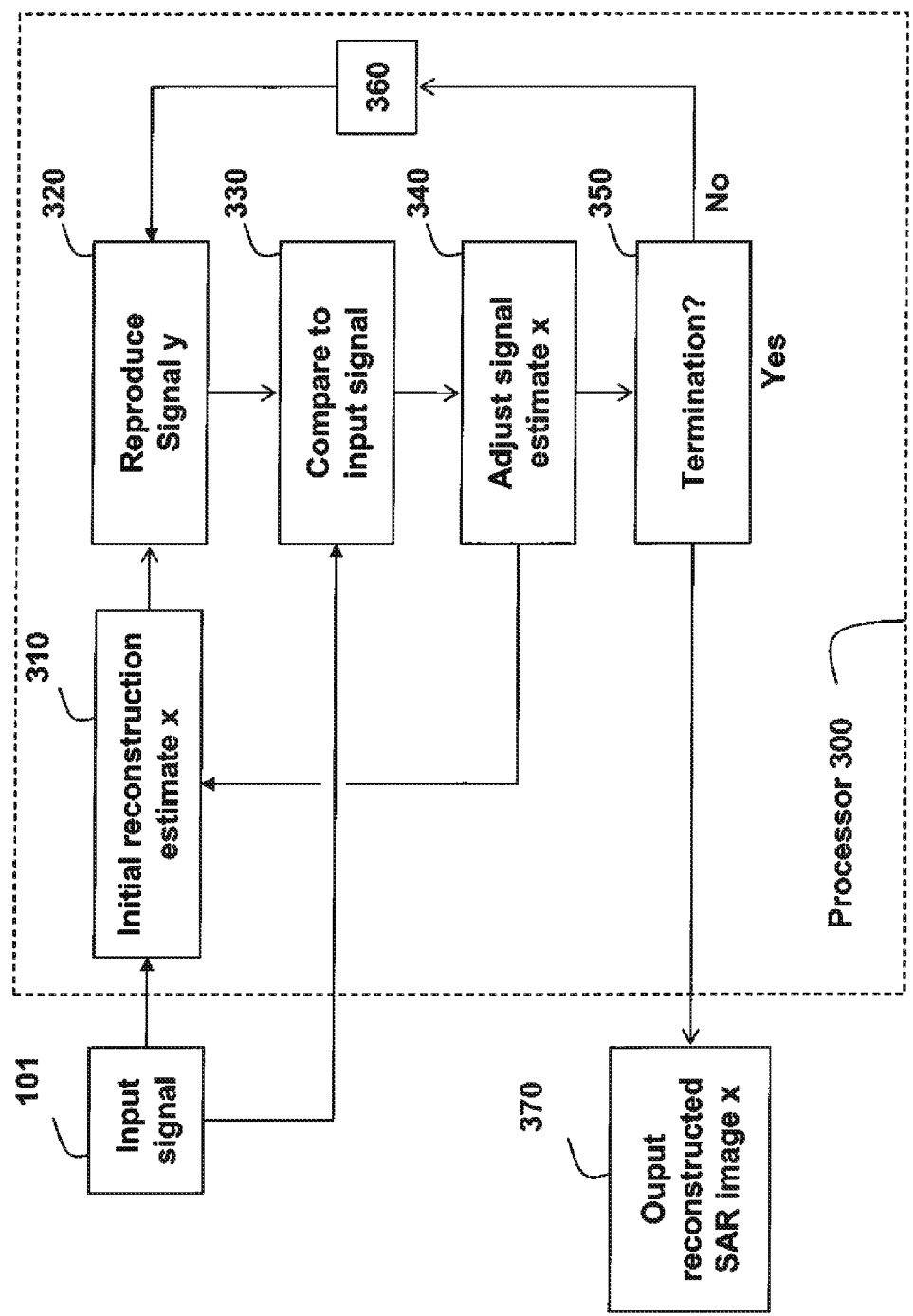
FIG. 3 is a flow diagram of a method for reconstructing a SAR image according to embodiments of the invention.

We use a first-order gradient descent process to minimize the cost function in Eqn. (5), as shown in FIG. 3. More sophisticated second-order procedures can also be considered. This optimization starts with estimating 310 an initial reconstruction x, which can be computed, for example, using the CSA, or set to 0, or set arbitrarily.

During each iteration 360, a signal y is reproduced 320 using $$y = Ax,$$

and the reproduced signal is compared 330 to the input signal to determine the residual vector r in Eqn. (6), and a total cost using the quadratic penalty in Eqn. (5). To adjust 340 the estimate, the gradient g corresponding to Eqn. (5) is computed using $$g = A^H r,$$

where A and $A^H$ are determined as described above. Then, a step of size r is taken in the direction opposite to the gradient g, i.e., the iterates are updated as $$x \leftarrow x - \tau g,$$

until a termination condition 350 is reached.

The step size $\tau$ is selected optimally through an exact line search, which minimizes the function $f(y, Ax)$ along a line parallel to the negative gradient $-g$. This line search efficiently optimizes a 1-D convex piecewise-quadratic function.

There are several possible termination conditions. For example, the iterations might terminate if the change in the reconstructed image estimate x is small, or the quadratic penalty in Eqn (5) in the comparison step is small. The method outputs the reconstructed image 370 when the termination condition is reached. The above steps can be performed in a processor 300 connected to a memory and input/output interfaces as known in the art.

Azimuth Ambiguity and Model Mismatch

Ambiguity in the azimuth frequency domain due to undersampling is an issue affecting many SAR image formation procedures. The azimuth sampling rate, which is equal to the pulse repetition frequency, is typically insufficient to accommodate the bandwidth of the azimuth response $H_a(R_0, f_\eta)$ and cannot be increased without decreasing the width of the imaged region. The undersampling results in aliasing, which manifests itself in the form of ghost images superimposed at specific azimuth and range offsets. Recovery from aliasing is difficult without additional information regarding the image. It cannot be assumed, for example, that the image itself is bandlimited.

In the basic method described above, mismatch between the true acquisition system and the model used in the reconstruction poses an additional challenge. For example, the azimuth response $H_a(R_0, f_\eta)$ depends on parameters such as the length and weighting pattern of the antenna. The values of these parameters cannot be known precisely, potentially leading to incorrect results. In particular, our experience suggests that model mismatch tends to exaggerate the ghost images caused by azimuth ambiguity. One method to reduce ghosting is to filter the data, either non-adaptively, or adaptively in space, to remove azimuth frequencies that are most affected by aliasing. However, that approach can reduce the amount of data available for reconstruction, and consequently, the resolution of the resulting image.

An alternative approach is to perform ghost removal at the end of each iteration in the basic method above. We exploit the ability to predict the locations of ghosts relative to the corresponding true target based on knowledge of the SAR parameters. In the first iteration of the method, image regions that are likely to be dominant sources of ghosts are identified, first by forming a low-resolution, ambiguity-free image, and then comparing the local power between regions separated by distances characteristic of ghosts. In subsequent iterations, ghosts due to dominant sources are estimated by correlating the current image with itself, one azimuth line at a time, and then subtracting the estimates from the image. Restricting the estimation and subtraction to dominant sources enables efficient removal of ghosts.

In the context of inverse problems, our method can be thought of as adding an explicit constraint to the reconstruction optimization problem in Eqn. (2), specifically on the autocorrelation of the image at certain locations and shifts. This is based on the premise that large autocorrelation values should not occur in ghost-free images. An alternative incorporates such knowledge in the signal model term g(x).

Signal Models

Significant improvements in reconstruction accuracy can be achieved by incorporating signal models in the reconstruction. In addition to the ghost reduction model described above, natural images exhibit significant structure. The model we impose is that the wavelet transform of the magnitude of the SAR images is sparse. As defined herein, a sparse signal is one where the number of non-zero values is substantially smaller than the number of zero values.

We use soft thresholding in a manner similar to a fixed-point continuation procedure for $l_1$ minimization to impose the model, see Hale et al., "Fixed-point continuation for $l_1$-minimization: methodology and convergence," SIAM J. Optim., vol. 19, no. 3, pp. 1107-1130, October 2008, incorporated herein by reference.

At the end of every iteration of our method, we transform the image or its magnitude, perform soft-thresholding, and transform back. If only the magnitude of the image was transformed, then we maintain the same phase. The motivation for this model is that the magnitude of the SAR image looks similar to a natural image and is therefore compressible using a wavelet transform. On the other hand, the phase of the image, which depends on the variation in height of the features being imaged and undergoes severe wrapping, does not appear to offer structure that can be exploited in the reconstruction.

EFFECT OF THE INVENTION

The embodiments of the invention formulate the reconstruction of synthetic aperture radar (SAR) images as an inverse problem. SAR is widely used in remote sensing to obtain high-resolution, wide-area radar images using a relatively small antenna. High resolution is made possible by exploiting the motion of the platform carrying the antenna, usually a plane or satellite, to synthesize a much larger aperture. The acquisition process in SAR involves transmitting pulses at regular intervals as the platform moves and recording the reflections to gain information about the reflectivity of the surface below.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. Method for processing an input signal acquired by a synthetic aperture radar (SAR) system, wherein the input signal is saturated, the method comprising the steps of:
    estimating an initial reconstruction that generated the input signal;
    reproducing the input signal from the reconstruction to generate a reproduced signal;
    comparing the reproduced signal with the input signal;
    adjusting an estimated reconstruction based on the comparison;
    applying an azimuth Fourier transform (FFT) to the input signal;
    applying a first chirp scaling to an output of the azimuth FFT;
    applying a range FFT to an output of the first chirp scaling;
    multiplying an output of the range FFT by a range frequency response;
    applying a range inverse FFT (IFFT) to an output of the range frequency response;
    applying a second chirp scaling to an output of the range IFFT;
    multiplying an output of the second chirp scaling by an azimuth frequency response;
    applying an azimuth IFFT to an output of the azimuth frequency response to form the reconstructed SAR image; and
    iterating from the reproducing step until a termination condition is reached to form a reconstructed SAR image, wherein the steps are performed in a processor.

2. The method in claim 1 in which the reproducing further comprises the steps of:
    applying an azimuth Fourier transform (FFT) to the input signal;
    multiplying an output of the azimuth FFT by an azimuth frequency response;
    applying a first chirp scaling to an output of the azimuth frequency response;
    applying a range FFT to an output of the first chirp scaling;
    multiplying an output of the range FFT by a range frequency response;
    applying a range inverse FFT (IFFT) to an output of the range frequency response;
    applying a second chirp scaling to an output of the range IFFT; and
    applying an azimuth IFFT to an output of the second chip scaling to form raw SAR data.

3. The method of claim 1, in which the adjusting is according to a signal model.

4. The method of claim 1, in which a signal model is incorporated after the iterations terminate.

5. The methods of claim 3 or 4, wherein the signal model imposes that a wavelet transform of the reconstructed SAR images or a wavelet transform of a magnitude of the reconstructed SAR image is sparse.

6. The methods of claim 5, further comprising:
    transforming the reconstructed SAR image or the magnitude to produce transformation coefficients;
    thresholding the transformation coefficients by setting coefficients with values less than a threshold value to zero; and
    inverse transforming the thresholded coefficients to form the reconstructed SAR image.

7. The method of claim 1, further comprising:
    reducing ghost images.

8. The method of claim 7, in which reducing further comprises the steps of:
    identifying locations of the ghost images; and
    removing the ghost images from the locations.

9. The method of claim 7, in which reducing is applied during the adjusting.

10. The method of claim 7, in which reducing is applied after the iterating.

11. The method of claim 1 in which the comparing enforces a saturation consistency.

12. The method of claim 1 in which adjusting is performed using a gradient descent.

13. The method of claim 12 in which the gradient descent uses a line search.

* * * * *